(12) United States Patent
Suzuki et al.

(10) Patent No.: US 11,307,379 B2
(45) Date of Patent: Apr. 19, 2022

(54) LENS BARREL AND OPTICAL APPARATUS

(71) Applicant: CANON KABUSHIKI KAISHA, Tokyo (JP)

(72) Inventors: Nobuyoshi Suzuki, Tokyo (JP); Atsuto Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 16/691,139

(22) Filed: Nov. 21, 2019

(65) Prior Publication Data

US 2020/0166729 A1 May 28, 2020

(30) Foreign Application Priority Data

Nov. 26, 2018 (JP) .............................. JP2018-220451

(51) Int. Cl.
*G02B 7/10* (2021.01)
*G02B 13/00* (2006.01)

(52) U.S. Cl.
CPC ............. *G02B 7/10* (2013.01); *G02B 13/004* (2013.01)

(58) Field of Classification Search
CPC . G02B 7/04; G02B 7/10; G02B 7/102; G02B 7/021; G02B 7/022; G02B 7/026; G02B 7/023; G02B 7/08; G02B 7/00; G02B 7/09; G02B 7/02; G02B 13/004; G03B 17/04

See application file for complete search history.

(56) References Cited

U.S. PATENT DOCUMENTS

2012/0044580 A1* 2/2012 Suzuki ................... G03B 17/02
359/700

FOREIGN PATENT DOCUMENTS

JP 2016-057424 A 4/2016

\* cited by examiner

*Primary Examiner* — Ephrem Z Mebrahtu
(74) *Attorney, Agent, or Firm* — Cowan, Liebowitz & Latman, P.C.

(57) ABSTRACT

A lens barrel includes a first cam member including a first cam portion engaged with a first lens holding member, the first cam member being configured to rotate and to move the first lens holding member, and a second cam member including a second cam portion engaged with a second lens holding member, the second cam member being configured to rotate around the optical axis to move the second lens holding member in the optical axis direction via the second cam portion. A third engagement portion provided on one of the first lens holding member and the second cam member is engaged with a third cam portion provided on the other. The second cam member is rotated, and moved in the optical axis direction by the third cam portion.

4 Claims, 8 Drawing Sheets

LENS BARREL AND OPTICAL APPARATUS

BACKGROUND OF THE INVENTION

Field of the Invention

The present invention relates to a lens barrel used for an optical apparatus, such as an imaging apparatus and an interchangeable lens.

Description of the Related Art

An imaging apparatus (referred to as a camera hereinafter) such as a digital camera is demanded for a high zoom magnification with a reduced thickness of a camera body. In this case, there is a demand for a structure that thins the camera body while making a moving stroke of a lens unit as long as possible in a lens barrel provided in the camera body.

In the zoom lens barrel having a movable barrel that is retractable relative to a base barrel fixed to the camera body in accordance with the magnification variation, the base barrel rotatably supports a cam barrel for moving the movable barrel in the optical axis direction. Japanese Patent Laid-Open No. ("JP") 2016-57424 discloses a lens barrel that includes a cam portion for moving a lens unit in an optical axis direction in a drive barrel that is rotationally driven to move the cam barrel in the optical axis direction while rotating the cam barrel, and moves more lens units in the optical axis direction.

However, in the lens barrel disclosed in JP 2016-57424, the lens unit held by the cam barrel and the lens unit held by the drive barrel are more likely to decenter than a case where they are held by the same member.

SUMMARY OF THE INVENTION

The present invention provides a lens barrel that can suppress eccentricity between lens units moving in an optical axis direction.

A lens barrel according to one aspect of the present invention includes a first lens unit, a first lens holding member configured to hold the first lens unit, a first cam member including a first cam portion engaged with a first engagement portion provided on the first lens holding member, the first cam member being configured to rotate around an optical axis direction and to move the first lens holding member, a second lens unit, a second lens holding member configured to hold the second lens unit, and a second cam member including a second cam portion engaged with a second engagement portion provided on the second lens holding member, the second cam member being configured to rotate around the optical axis to move the second lens holding member in the optical axis direction via the second cam portion. A third engagement portion provided on one of the first lens holding member and the second cam member is engaged with a third cam portion provided on the other. The second cam member is rotated when a rotation of the first cam member is transmitted to the second cam member, and moved in the optical axis direction by the third cam portion. An optical apparatus including this lens barrel also constitutes another aspect of the present invention.

Further features of the present invention will become apparent from the following description of exemplary embodiments with reference to the attached drawings.

DESCRIPTION OF THE EMBODIMENTS

Figure 1:
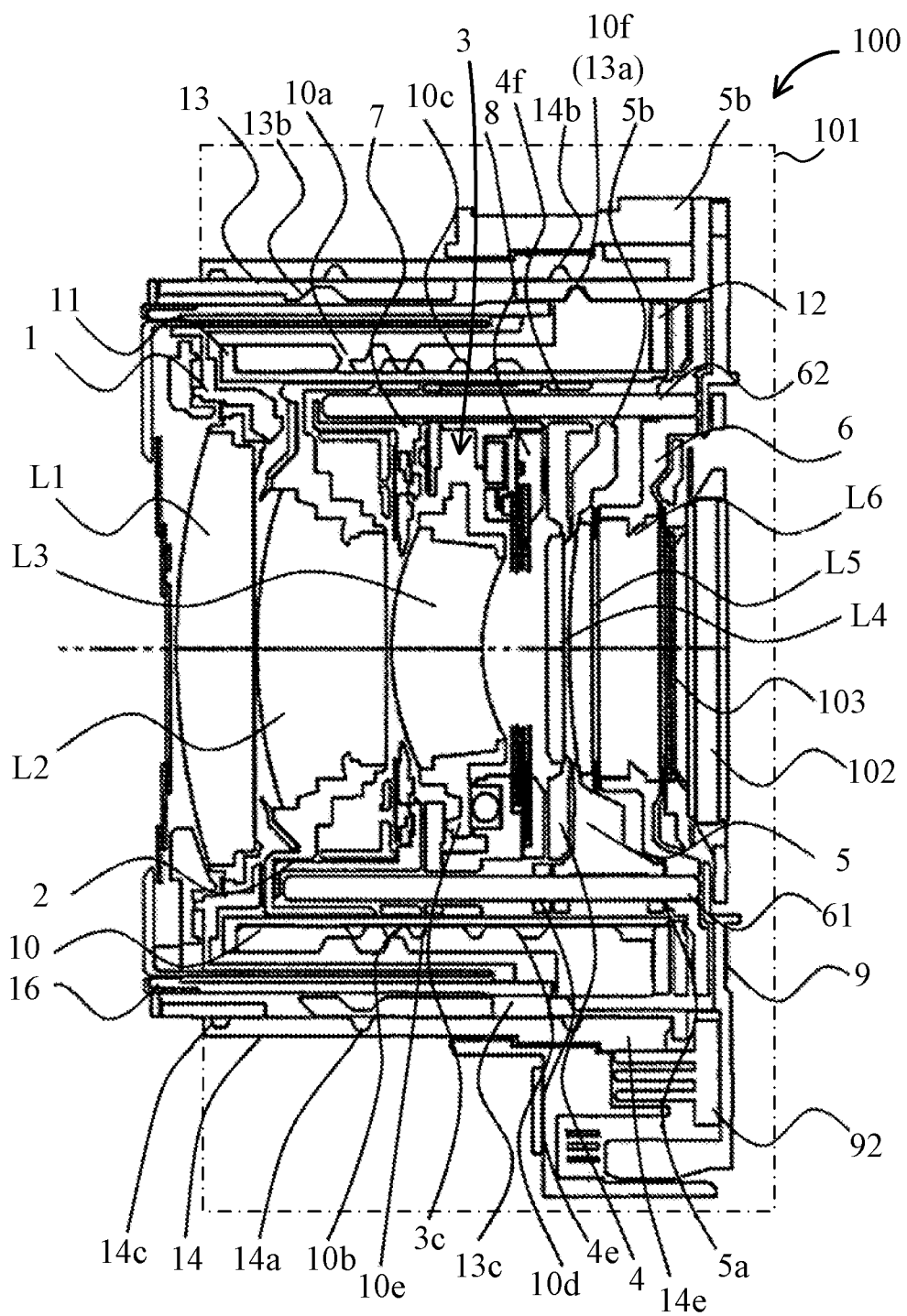
FIG. 1 is a sectional view of a lens barrel in a retracted state according to one embodiment of the present invention.
Figure 2:
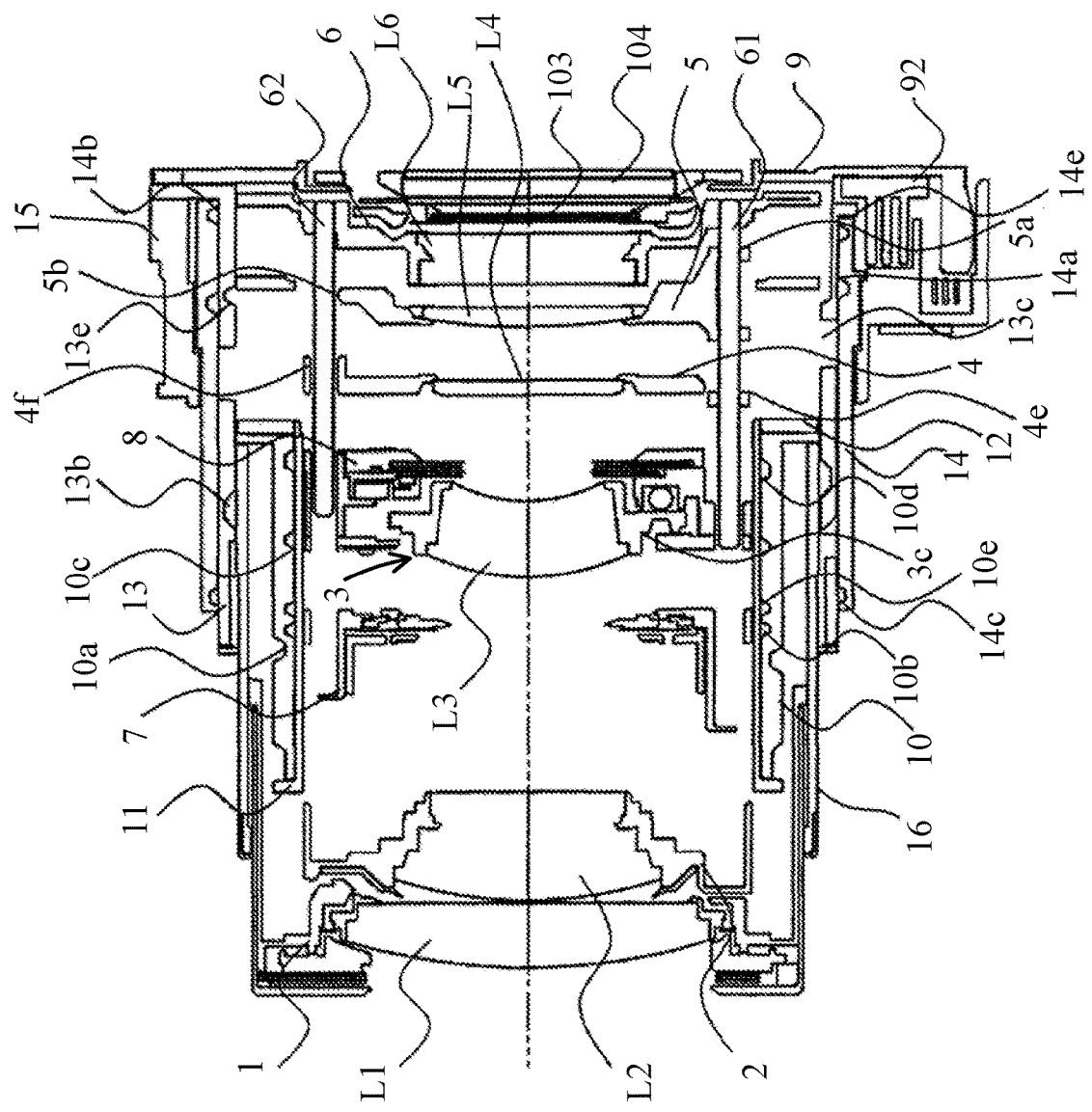
FIG. 2 is a sectional view of the lens barrel in a protruded (imageable) state according to this embodiment.
Figure 3:
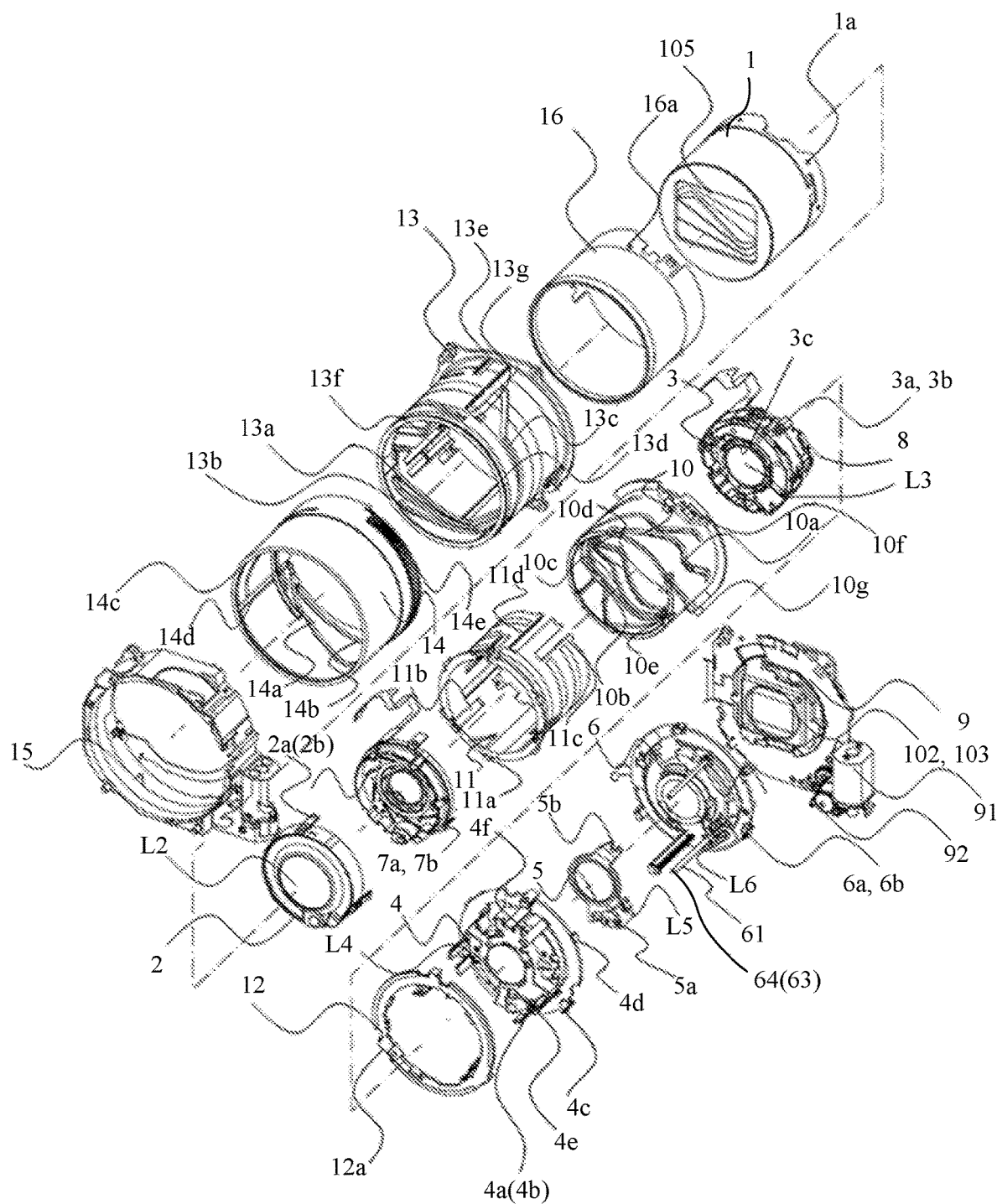
FIG. 3 is an exploded view of the lens barrel according to this embodiment.
Figure 4:
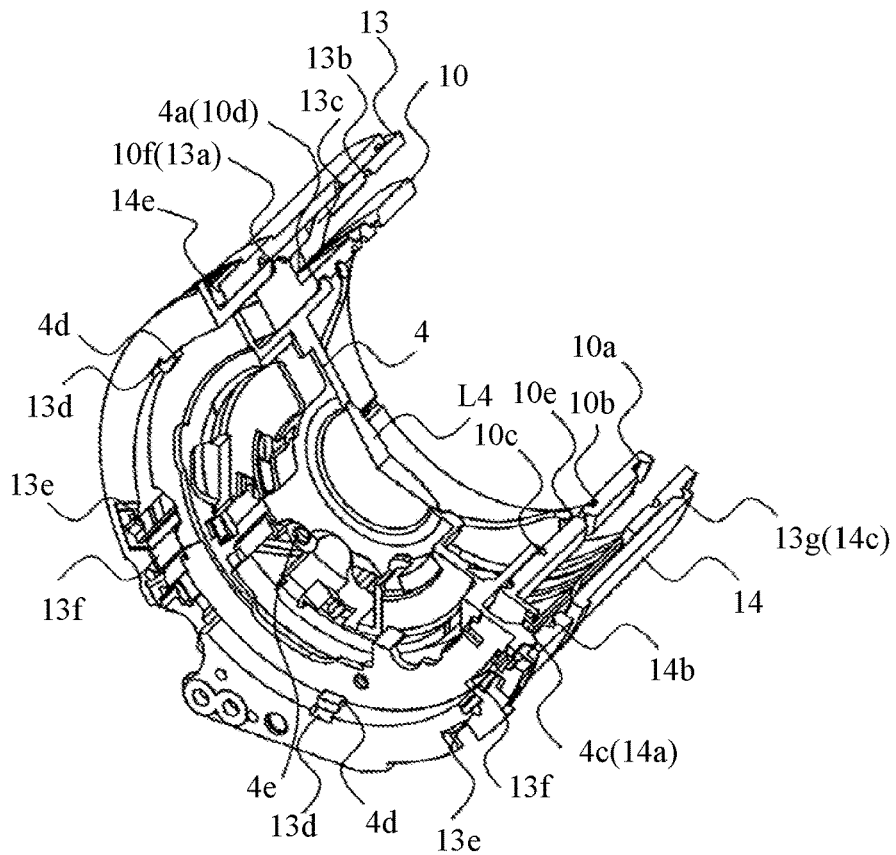
FIG. 4 illustrates an engagement relationship among a fourth holding frame, a cam barrel, and a drive barrel in the lens barrel according to this embodiment.
Figure 5:
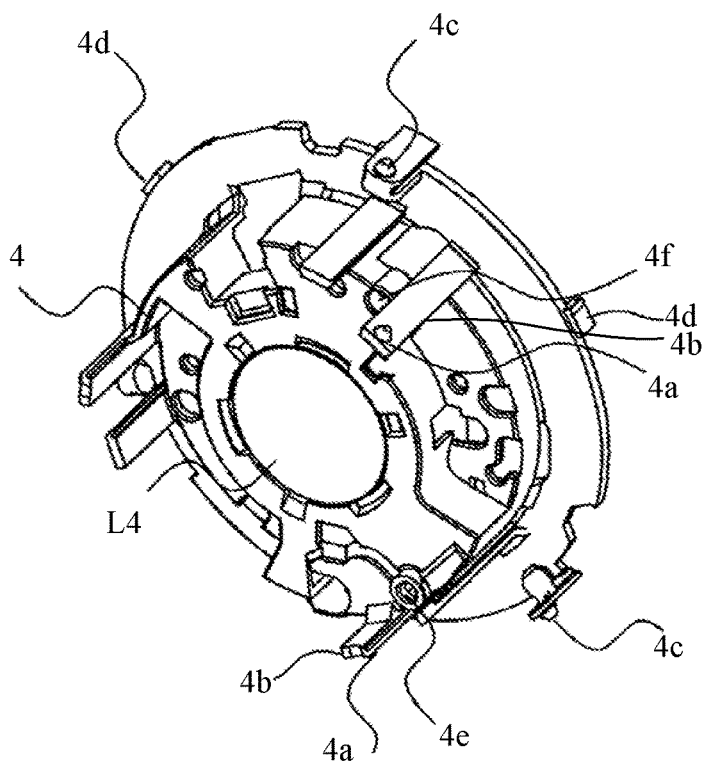
FIG. 5 is a perspective view of the fourth holding frame in the lens barrel according to this embodiment.
Figure 6:
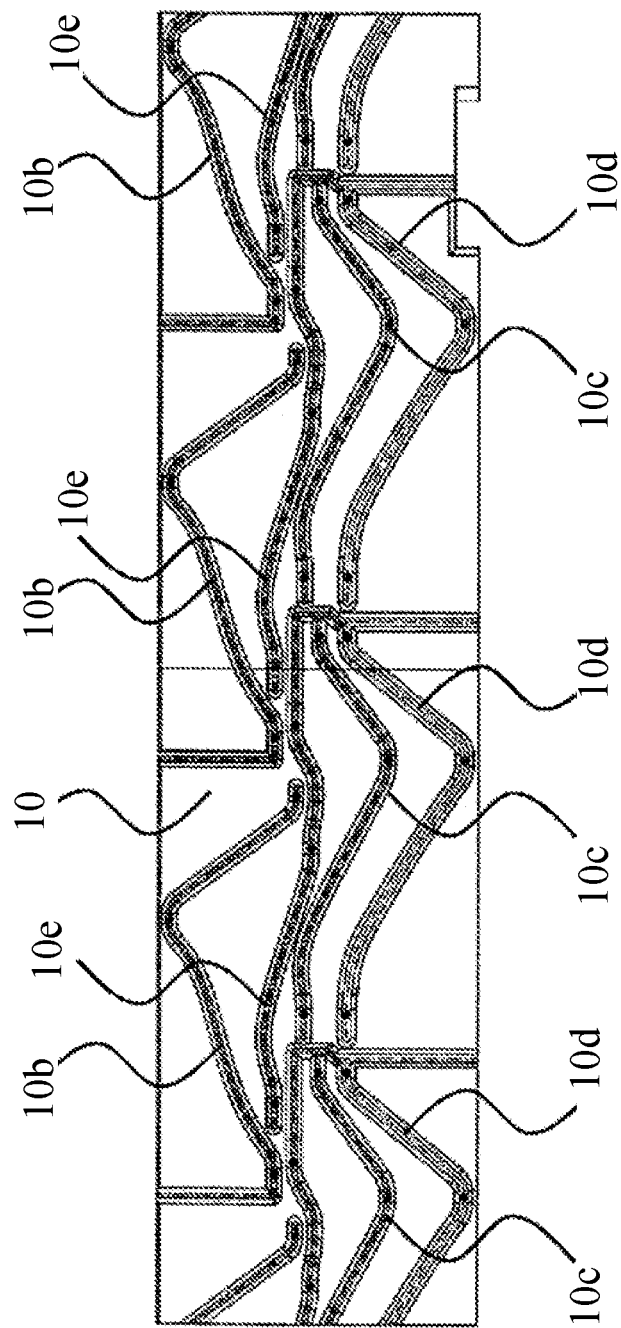
FIG. 6 is an exploded view showing an inner circumferential portion of the cam barrel in the lens barrel according to the embodiment.
Figure 7:
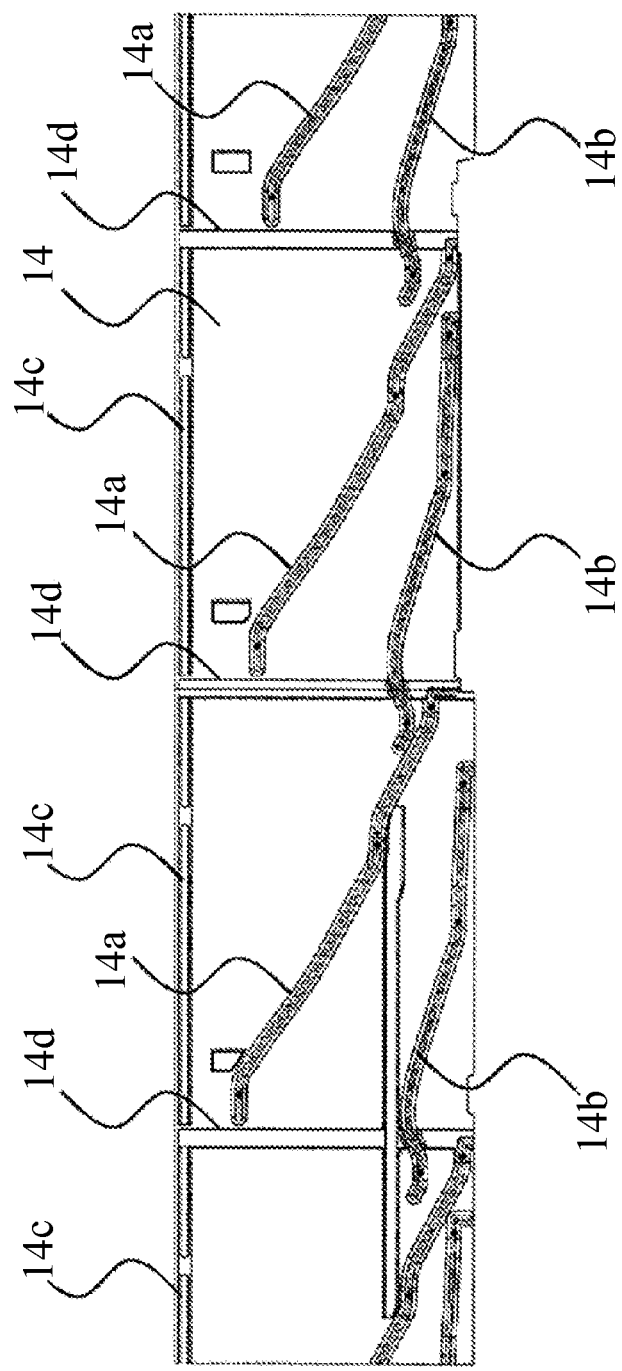
FIG. 7 is an exploded view showing an inner circumferential portion of the drive barrel in the lens barrel according to this embodiment.
Figure 8:
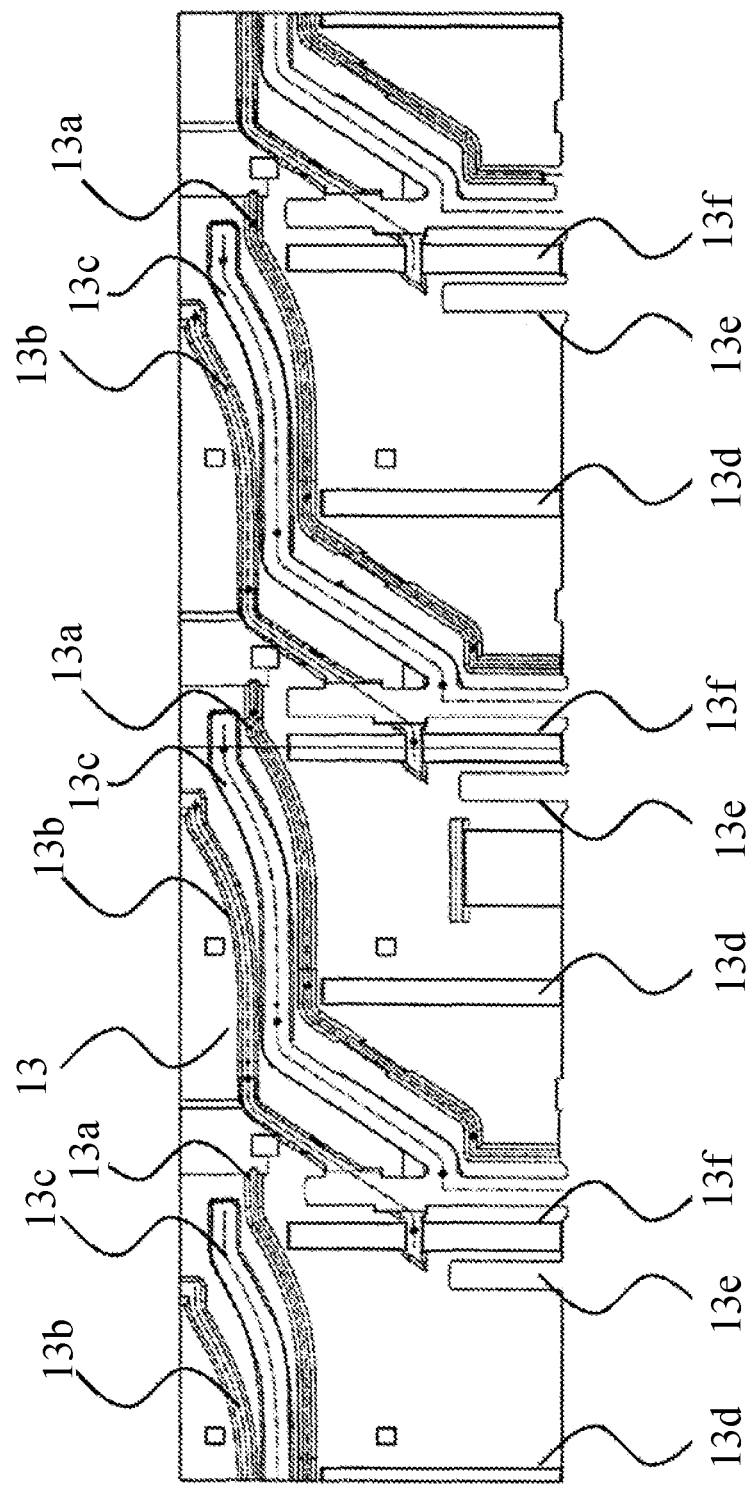
FIG. 8 is an exploded view showing an inner circumferential portion of a fixed barrel in the lens barrel according to this embodiment.
Figure 9:
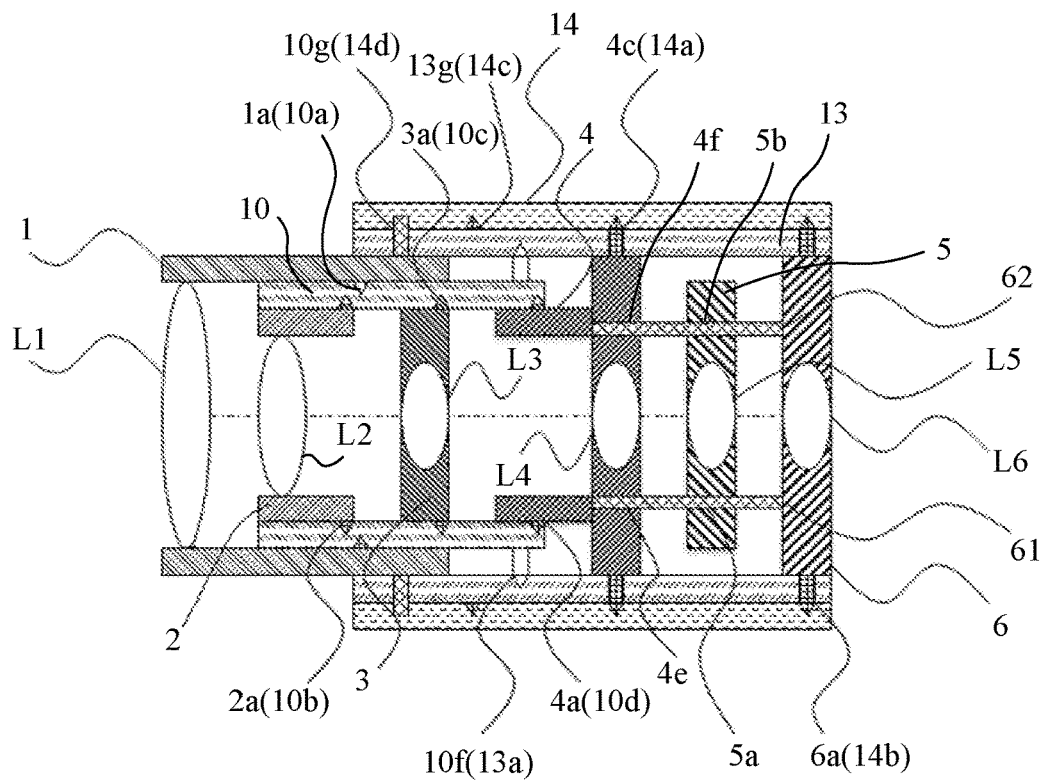
FIG. 9 is a schematic diagram illustrating a configuration of a lens barrel according to this embodiment.

Referring now to the accompanying drawings, a description will be given of embodiments according to the present invention. FIGS. 1 to 9 illustrate a configuration of a lens barrel according to one embodiment of the present invention. FIG. 1 illustrates a section of the lens barrel retracted in a camera body according to this embodiment, and FIG. 2 illustrates a section of the lens barrel in an imageable state protruding from the camera body. FIG. 3 is an exploded view of the lens barrel. FIG. 4 illustrates an engagement relationship between a fourth holding frame, a cam barrel, and a drive barrel in the lens barrel. FIG. 5 illustrates the fourth holding frame in the lens barrel. FIGS. 6, 7, and 8 respectively illustrate the inner circumferential portions of the cam barrel, the drive barrel, and the fixed barrel in the lens barrel in the circumferential direction. FIG. 9 schematically illustrates the configuration of the lens barrel.

The lens barrel according to this embodiment is used for a digital camera 100 as an optical apparatus (imaging apparatus). The digital camera 100 includes a body (camera body) 101 and an image sensor 102 that captures (photoelectrically converts) an object image formed by an imaging optical system (described later) in the lens barrel.

In the following description, a direction in which an optical axis of the lens barrel (imaging optical system) extends will be referred to as an optical axis direction, a direction in which a circle around the optical axis extends will be referred to as a circumferential direction, and a direction in which a radius of the circle extends from the optical axis will be referred to as a radial direction. The object side will be referred to as a front side, and the image side will be referred to as a rear side.

The lens barrel holds an imaging optical system as an optical system that includes a first lens L1, a second lens L2, a third lens L3, a fourth lens L4, a fifth lens L5, and a sixth lens L6 arranged in order from the front side to the rear side. The fourth lens L4 corresponds to a first lens unit, and the first lens L1, the second lens L2, and the third lens L3 correspond to a second lens unit. The sixth lens L6 corresponds to a third lens unit, and the fifth lens L5 corresponds to a fourth lens unit.

The fourth lens L4 is held by a fourth holding frame 4 serving as a first lens holding member, and each of the first lens L1, the second lens L2, and the third lens L3 is a first barrel 1, a second barrel 2, and a shift lens holding frame 3c serving as a second lens holding member. The sixth lens L6 and the fifth lens L5 are held by a sixth holding frame 6 serving as a third lens holding member and a fifth holding frame 5 serving as a fourth lens holding member, respectively.

The first barrel 1 has cam pins (second engagement portions) 1a at six locations in the circumferential direction on the inner circumference thereof. These cam pins 1a are engaged with six cam groove portions (second cam portions) 10a formed on the outer circumferential portion of the cam barrel (second cam member) 10. In addition, unillustrated linear groove portions extending in the optical axis direction are formed at three locations in the circumferential direction on the inner circumferential portion of the first barrel 1. Linear keys 11a formed at three positions on the outer circumferential portion of the linear barrel 11 are engaged with these linear groove portions. A front end surface of the first barrel 1 has an opening for taking a light beam from an object into the imaging optical system. The first barrel 1 has a lens barrier mechanism 105 that opens and closes the opening.

A second barrel 2 has cam pins (second engagement portions) 2a at three positions on its outer circumferential portion. These cam pins 2a are engaged with three cam groove portions (second cam portions) 10b formed on the inner circumferential portion of the cam barrel 10. In addition, linear keys 2b are formed at three locations in the circumferential direction of the second barrel 2 in the same phase as that of the three cam pins 2a. These linear keys 2b are engaged with linear groove portions 11b formed to extend in the optical axis direction at three locations in the circumferential direction of the linear barrel 11.

An image stabilization unit 3 has an image stabilization base member and a shift lens holding frame 3c described above, and the shift lens holding frame 3c and provides an image stabilization by shifting the shift lens holding frame 3c and the third lens L3 held by the shift lens holding frame 3c in accordance with a camera shake such as a manual shake in a direction orthogonal to the optical axis direction.

Cam pins (second engagement portions) 3a are provided at three locations in the circumferential direction on the outer circumferential portion of the image stabilization base member. These cam pins 3a are engaged with three cam groove portions (second cam portions) 10c formed on the inner circumferential portion of the cam barrel 10. In addition, linear keys 3b are formed at three positions in the same phase as that of the three cam pins 3a in the circumferential direction on the outer circumferential portion of the image stabilization base member. These linear keys 3b are engaged with linear groove portions 11c formed to extend in the optical axis direction at three locations in the circumferential direction of the linear barrel 11.

The fourth holding frame 4 has cam pins (third engagement portions) 4a at three locations on its outer circumferential portion. These cam pins 4a are engaged with three cam groove portions (third cam portions) 10d formed on the inner circumferential portion of the cam barrel 10. Linear keys 4b are formed at three locations in the circumferential direction of the fourth holding frame 4 at the same phase as that of the three cam pins 4a. These linear keys 4b are engaged with linear groove portions 11c of the linear barrel 11.

Cam pins (first engagement portions) 4c are formed at three positions having a phase different from that of the cam pins 4a in the circumferential direction on the outer circumferential portion of the fourth holding frame 4. These cam pins 4c are engaged with three cam groove portions (first cam portions) 14a formed on the inner circumferential portion of the drive barrel (first cam member) 14. In addition, linear keys 4d extending in the optical axis direction are formed at three locations in the circumferential direction on the outer circumferential portion of the fourth holding frame 4. These linear keys 4d are engaged with linear groove portions 13d formed so as to extend in the optical axis direction at three locations in the circumferential direction of the fixed barrel 13 serving as the lens barrel base member.

The fixed barrel 13 and a fixed cover barrel 15 arranged on its outer circumference are fixed onto the fixed base plate 9 by unillustrated screws. The fixed base plane 9 holds the image sensor 102 and an optical filter 103 disposed on the front surface thereof.

A positioning portion 5a and a stabilization portion 5b formed on the fifth holding frame 5 are respectively engaged with guide bars 61 and 62 held by a sixth holding frame 6 described later so as to be movable in the optical axis direction. A positioning portion 4e and a stabilization portion 4f formed on the fourth holding frame 4 are also engaged with the guide bars 61 and 62 so as to be movable in the optical axis direction.

An unillustrated rack is attached to the fifth holding frame 5. The rack is engaged with a lead screw 64 formed on the output shaft of a stepping motor 63 held by the sixth holding frame 6. As the stepping motor 63 rotates, a driving force in the optical axis direction is applied to the fifth holding frame 5 by the engagement between the lead screw 64 and the rack. The fifth holding frame 5 moves in the optical axis direction without rotating when the positioning portion 5a and the stabilization portion 5b are engaged with the guide bars 61 and 62.

The sixth holding frame 6 has cam pins (fourth engagement portions) 6a at three locations in the circumferential direction on its outer circumferential portion. These cam pins 6a are engaged with three cam groove portions (fourth cam portions) 14b formed in the inner circumferential portion of the drive barrel 14. In addition, linear keys 6b is provided at three positions in the same phase as that of the three cam pins 6a in the circumferential direction of the sixth holding frame 6. These linear keys 6b are engaged with perforation groove portions 13e formed in the fixed barrel 13.

A diaphragm (aperture stop) unit 7 adjusts a light amount reaching the image sensor 102 and has cam pins 7a at three locations in the circumferential direction on its outer peripheral surface. These cam pins 7a are engaged with cam groove portions 10e formed on the inner circumferential portion of the cam barrel 10. Linear keys 7b are formed at three positions in the circumferential direction of the diaphragm unit 7 in the same phase as that of the three cam pins 7a. These linear keys 7b are engaged with linear groove portions 11d formed in the linear barrel 11 so as to extend in the optical axis direction.

A shutter ND unit 8 is a unit that controls an exposure amount of the image sensor 102 and inserts and removes the ND filter, and is fixed onto the image stabilization unit 3 by unillustrated screws.

External force absorbing pins (projection portions) 10f are provided at three locations in the circumferential direction on the outer circumferential portion of the cam barrel 10. These external force absorbing pins 10f are inserted into three external force absorbing groove portions (receiving portions) 13a formed in the inner circumferential portion of the fixed barrel 13 with predetermined gaps. Drive pins 10g are provided at three locations in the circumferential direction on the outer circumferential portion of the cam barrel 10. These drive pins 10g perforate the three perforation groove portions 13c formed in the fixed barrel 13 in the radial direction, and are engaged with the linear groove portions 14d in three directions in the inner circumferential portion of the drive barrel 14 so as to extend in the optical axis direction.

The cam barrel 10 disposed on the outer circumference of the linear barrel 11 is sandwiched between a front end flange portion of the linear barrel 11 and a linear plate 12 fixed onto a rear end of the linear barrel 11 rotatably in the circumferential direction, and moves integrally with the barrel 11 and the linear plate 12 in the optical axis direction.

A movable cover barrel 16 is fixed onto a rear end flange portion of the cam barrel 10 so as to cover the outer circumference of the cam barrel 10. External force absorbing pins 16a are provided at three locations in the circumferential direction on the outer circumferential portion of the movable cover barrel 16. These external force absorbing pins 16a are inserted so as to form a predetermined gap with the three external force absorbing groove portions 13b formed on the inner circumferential portion of the fixed barrel 13.

Due to the above structure, the fixed barrel 13 guides the fourth holding frame 4 and the sixth holding frame 6 in the optical axis direction without rotating in the circumferential direction. The fourth holding frame 4 guides the linear barrel 11 in the optical axis direction while preventing the rotation in the circumferential direction. The linear barrel 11 guides the first barrel 1, the second barrel 2, the image stabilization unit 3, and the aperture unit 7 in the optical axis direction while preventing their rotations in the circumferential direction.

Linear keys 12a provided at three locations in the circumferential direction on the outer circumferential portion of the linear plate 12 are inserted into three linear groove portions 13f formed in the fixed barrel 13 so as to extend in the optical axis direction with predetermined gaps.

Three cam groove portions 14c formed on the inner circumferential portion of the drive barrel 14 are engaged with three cam pins 13g provided on the outer circumferential portion of the fixed barrel 13. A gear portion 14e formed to extend in the circumferential direction on the outer circumferential portion of the drive barrel 14 is engaged with an output gear of a gear train 92 that transmits a driving force from a DC motor 91 held by the fixed base plate 9.

As the drive barrel 14 is rotated by the driving force from the DC motor 91, the fourth holding frame 4 moves in the optical axis direction without rotating in the circumferential direction due to a cam action between its cam pin 4c and the cam groove portion 14a of the drive barrel 14, and the linear key 4d of the fourth holding frame 4 and the engagement with the linear groove 13d of the fixed barrel 13. Further, the cam barrel 10 rotates in the circumferential direction as the drive barrel 14 rotates due to the engagement between the drive pin 10g and the linear groove 14d of the drive barrel 14. The rotating cam barrel 10 moves in the optical axis direction by the cam action between the cam groove portion 10d and the cam pin 4a of the fourth holding frame 4.

The first barrel 1 moves in the optical axis direction without rotating in the circumferential direction due to the cam action between its cam pin 1a and the cam groove portion 10a in the cam barrel 10 and the engagement between the linear groove portion 1b and the linear key 11a of the linear barrel 11.

The second barrel 2 moves in the direction of the optical axis without rotating in the circumferential direction due to the cam action between its the cam pin 2a and the cam groove portion 10b in the cam barrel 10 and the engagement between the linear key 2b of the second barrel 2 and the linear groove portion 11b in the linear barrel 11.

The image stabilization unit 3 moves in the direction of the optical axis without rotating in the circumferential direction due to the cam action between the cam pin 3a and the cam groove portion 10c in the cam barrel 10 and the engagement between the linear key 3b of the image stabilization unit 3 and the linear groove portion 11c in the linear barrel 11.

The sixth holding frame 6 moves in the optical axis direction without rotating around the optical axis due to the cam action between the cam pin 6a and the cam groove 14b in the drive barrel 14 and the engagement between the linear key 6b and the through groove 13e in the fixed barrel 13.

The diaphragm unit 7 moves in the optical axis direction without rotating around the optical axis due to the cam action between its cam pin 7a and the cam groove portion 10e in the cam barrel 10 and the engagement between the linear key 7b and the linear groove portion 11d in the linear barrel 11.

Figure 10:
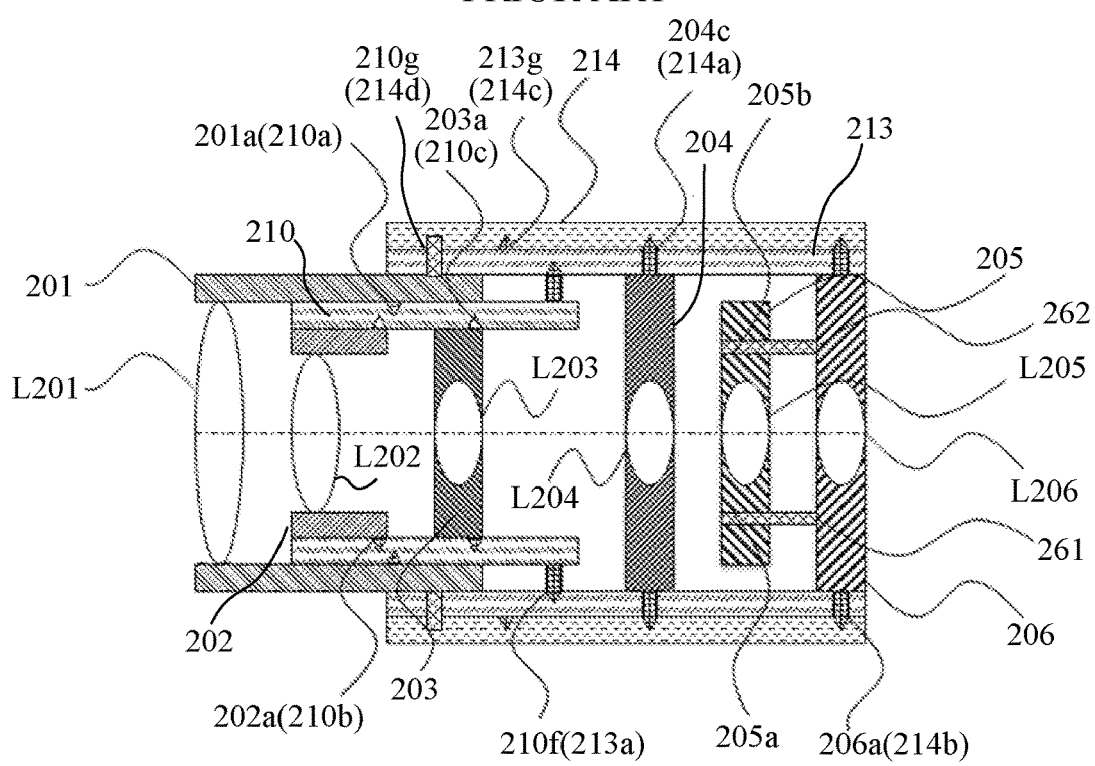
FIG. 10 illustrates a configuration of a conventional lens barrel.

Referring now to FIG. 9, a description will be given of an engagement relationship between each lens holding frame and the barrel member in the lens barrel according to this embodiment by comparing this embodiment with the conventional lens barrel illustrated in FIG. 10. Components in the conventional lens barrel illustrated in FIG. 10 that are common to the components of the lens barrel of this embodiment are denoted by reference numerals obtained by adding 200 to the reference numerals of this embodiment.

In the conventional lens barrel, the cam barrel 210 that holds the first barrel 201, the second barrel 202, and the third holding frame 203 and the drive barrel 214 that holds the fourth holding frame 204 and the sixth holding frame 206 are associated with each other via the fixed barrel 213. More specifically, the cam barrel 210 and the drive barrel 214 are indirectly connected to each other because the cam pin 210f of the cam barrel 210 and the cam groove 214c in the drive barrel 214 are engaged with the cam groove 213a and the cam pin 213g of the fixed barrel 213, respectively.

Thus, when the cam barrel 210 and the drive barrel 214 are indirectly connected to each other via the fixed barrel 213, the fixed barrel 213 affects the coaxial accuracies and facing (inclination) accuracies between the first barrel 201, the second barrel 202, and the third holding frame 203 held by the cam barrel 210, and the fourth holding frame 4 and the sixth holding frame 6 held by the driving barrel 214. In other words, it is difficult to maintain the coaxial accuracies and the facing accuracies between the front unit including the first lens L201, the second lens L202, and the third lens L203, and the rear unit including the fourth lens L204, the fifth lens L205, and the sixth lens L206.

On the other hand, in the lens barrel of this embodiment, the cam groove portion 10d in the cam barrel 10 configured to hold the first barrel 1, the second barrel 2, and the third holding frame 3, and the cam pin 4a of the fourth holding frame 4 are engaged directly with each other without intervening the fixed barrel 13. Hence, the fixed barrel 13 does not affect the coaxial accuracies and the facing accuracies among the first barrel 1, the second barrel 2, and the third holding frame 3 held by the cam barrel 10, and the fourth holding frame 4, and the coaxial accuracies and facing accuracies can be easily maintained.

The cam pin 4c of the fourth holding frame 4 is engaged with the cam groove portion 14a in the driving barrel 14, the cam pin 6a of the sixth holding frame 6 is also engaged with the cam groove portion 14b in the driving barrel 14, and the fourth holding frame 4 and the sixth holding frame 6 are integrated by guide bars 61 and 62 held by them. In other words, when the fourth holding frame 4 supports front ends of the guide bars 61 and 62 fixed to the sixth holding frame 6, the front ends of the guide bars 61 and 62 can be stabilized. In the conventional lens barrel, when the guide bars 261 and 262 are cantilevered by the sixth holding frame 206, the guide bars 261 and 262 are likely to incline to the optical axis direction and consequently to incline to the optical axis. In this case, the fourth holding frame 204 has no component relationship with the sixth holding frame 206 via the guide bars 261 and 262, so that the coaxial accuracy and facing accuracy cannot be guaranteed between the fourth holding frame 204 and the third holding frame 206. On the other hand, this embodiment engages the fourth holding frame 4 and the sixth holding frame 6 with the same drive barrel 14, ensures the coaxial accuracy of the two holding frames 4 and 6, and thereby supports both ends 61 and 62 with the two holding frames 4 and 6. Thereby, the coaxial accuracy and the facing accuracy of the fourth, fifth, and sixth holding frames 4, 5, and 6 can be improved.

The fifth holding frame 5 is supported by the guide bars 61 and 62 movably in the optical axis direction. This configuration can reduce the eccentricities among the fourth holding frame 4, the fifth holding frame 5, and the sixth holding frame 6.

As described above, this embodiment is likely to maintain the coaxial accuracies and facing accuracies among the first barrel 1, the second barrel 2, and the third holding frame 3 held by the cam barrel 10, and the fourth, fifth, and the sixth holding frames 4 to 6 using the fourth holding frame 4 as a reference. In other words, it is easy to obtain the coaxial accuracies and facing accuracies from the first lens L1 to the sixth lens L6.

This embodiment inserts, as described above, the external force absorbing pin 10f of the cam barrel 10 into the external force absorbing groove portion 13a of the fixed barrel 13 with a predetermined gap. Further, this embodiment inserts the external force absorption pin 16a of the movable cover barrel 16 fixed to the cam barrel 10 into the external force absorption groove portion 13b of the fixed barrel 13 with a predetermined gap. Thereby, when the first barrel 1 receives an external force in the optical axis direction (toward the back), the external force absorption pins 10f and 16a contact the internal surfaces of the external force absorption groove portions 13a and 13b to accept the external force, and the external force can be prevented from causing a problem such as a disengagement between the cam barrel 10d and the cam pins 4a of the fourth holding frame 4.

Furthermore, this embodiment inserts the linear key 12a of the linear plate 12 into the linear groove portion 13f in the fixed barrel 13 with a predetermined gap. When the external force in the optical axis direction is applied to the first barrel 1, the external force in the rotational direction is applied to the cam barrel 10 via the cam groove portion 10a, and a circumferential reaction force in the direction opposite to the cam barrel 10 is applied to the first barrel 1 and/or the linear barrel 11. Thus, when the first barrel 1 receives a circumferential force, the linear key 12a of the linear plate 12 fixed onto the linear barrel 11 that linearly guides the first barrel 11 contacts the inner surface of the linear groove portion 13f and receives the external force. The external force prevents the linear barrel 11 from rotating in the circumferential direction.

This embodiment has described the cam pin 4a provided on the fourth holding frame 4 and engaged with the cam groove portion 10d provided on the cam barrel 10, but the cam pin provided on the cam barrel may be engaged with the cam groove portion provided in the fourth holding frame. In other words, a cam pin provided on one of the fourth holding frame and the cam barrel may be engaged with a cam groove provided in the other.

This embodiment has described a two-stage telescopic lens barrel in which the first barrel and the cam barrel move in the optical axis direction relative to the fixed barrel, but the embodiment according to the present invention covers an at least three-stage telescopic lens barrel having three or more movable barrel that move relative to the fixed barrel in the optical axis direction.

This embodiment has been described the cam groove portion and the cam pin engaged with each other, but the cam engagement portion may be engaged with the cam portion formed as a protrusion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-220451, filed on Nov. 26, 2018, which is hereby incorporated by reference herein in its entirety.

What is claimed is:

1. A lens barrel comprising:
a first lens unit;
a first lens holding member configured to hold the first lens unit;
a first cam member including a first cam portion engaged with a first engagement portion provided on the first lens holding member, the first cam member being configured to rotate around an optical axis direction and to move the first lens holding member;
a second lens unit;
a second lens holding member configured to hold the second lens unit;
a second cam member including a second cam portion engaged with a second engagement portion provided on the second lens holding member, the second cam member being configured to rotate around the optical axis to move the second lens holding member in the optical axis direction via the second cam portion;
a third lens holding member configured to hold a third lens unit and including a fourth engagement portion engaged with a fourth cam portion provided on the first cam member; and
a fourth lens holding member for holding a fourth lens unit,
wherein a third engagement portion provided on one of the first lens holding member and the second cam member is engaged with a third cam portion provided on the other,
wherein the second cam member is rotated when a rotation of the first cam member is transmitted to the second cam member, and moved in the optical axis direction by the third cam portion, and wherein the fourth lens holding member is supported movably in the optical axis direction by a guide bar held by the first lens holding member and the third lens holding member.

2. A lens barrel comprising:

a first lens unit;

a first lens holding member configured to hold the first lens unit;

a first cam member including a first cam portion engaged with a first engagement portion provided on the first lens holding member, the first cam member being configured to rotate around an optical axis direction and to move the first lens holding member;

a second lens unit;

a second lens holding member configured to hold the second lens unit;

a second cam member including a second cam portion engaged with a second engagement portion provided on the second lens holding member, the second cam member being configured to rotate around the optical axis to move the second lens holding member in the optical axis direction via the second cam portion; and a base member configured to rotatably support the first cam member, wherein a third engagement portion provided on one of the first lens holding member and the second cam member is engaged with a third cam portion provided on the other, wherein the second cam member is rotated when a rotation of the first cam member is transmitted to the second cam member, and moved in the optical axis direction by the third cam portion, and wherein the base member has a receiving portion which a protrusion portion provided on the second cam member contacts when an external force is applied to the lens barrel.

3. An optical apparatus comprising a lens barrel, wherein the lens barrel includes:

a first lens unit;

a first lens holding member configured to hold the first lens unit;

a first cam member including a first cam portion engaged with a first engagement portion provided on the first lens holding member, the first cam member being configured to rotate around an optical axis direction and to move the first lens holding member;

a second lens unit;

a second lens holding member configured to hold the second lens unit;

a second cam member including a second cam portion engaged with a second engagement portion provided on the second lens holding member, the second cam member being configured to rotate around the optical axis to move the second lens holding member in the optical axis direction via the second cam portion;

a third lens holding member configured to hold a third lens unit and including a fourth engagement portion engaged with a fourth cam portion provided on the first cam member; and a fourth lens holding member for holding a fourth lens unit, wherein a third engagement portion provided on one of the first lens holding member and the second cam member is engaged with a third cam portion provided on the other, wherein the second cam member is rotated when a rotation of the first cam member is transmitted to the second cam member, and moved in the optical axis direction by the third cam portion, and wherein the fourth lens holding member is supported movably in the optical axis direction by a guide bar held by the first lens holding member and the third lens holding member.

4. An optical apparatus comprising a lens barrel, wherein the lens barrel includes:

a first lens unit;

a first lens holding member configured to hold the first lens unit;

a first cam member including a first cam portion engaged with a first engagement portion provided on the first lens holding member, the first cam member being configured to rotate around an optical axis direction and to move the first lens holding member;

a second lens unit;

a second lens holding member configured to hold the second lens unit;

a second cam member including a second cam portion engaged with a second engagement portion provided on the second lens holding member, the second cam member being configured to rotate around the optical axis to move the second lens holding member in the optical axis direction via the second cam portion; and a base member configured to rotatably support the first cam member, wherein a third engagement portion provided on one of the first lens holding member and the second cam member is engaged with a third cam portion provided on the other, wherein the second cam member is rotated when a rotation of the first cam member is transmitted to the second cam member, and moved in the optical axis direction by the third cam portion, and wherein the base member has a receiving portion which a protrusion portion provided on the second cam member contacts when an external force is applied to the lens barrel.

* * * * *